(12) United States Patent
Daniel (10) Patent No.: US 9,784,565 B2
(45) Date of Patent: Oct. 10, 2017

(54) TRACK REFERENCE TARGETS AND METHOD OF USING SAME TO DEFINE LEFT AND RIGHT TOP-OF-RAIL ELEVATIONS

(71) Applicant: Brian S Daniel, Lexington, VA (US)

(72) Inventor: Brian S Daniel, Lexington, VA (US)

(73) Assignee: Leica Geosystems Inc., Norcross, GA (US)

( * ) Notice: Subject to any disclaimer, the term of this patent is extended or adjusted under 35 U.S.C. 154(b) by 0 days.

(21) Appl. No.: 14/723,180

(22) Filed: May 27, 2015

(65) Prior Publication Data

US 2015/0345943 A1 Dec. 3, 2015

Related U.S. Application Data

(60) Provisional application No. 62/003,972, filed on May 28, 2014.

(51) Int. Cl.
*G01C 3/08* (2006.01)
*G01B 11/14* (2006.01)
*G01C 5/00* (2006.01)

(52) U.S. Cl.
CPC ............ *G01B 11/14* (2013.01); *G01C 3/08* (2013.01); *G01C 5/00* (2013.01)

(58) Field of Classification Search
CPC ............ G01B 11/14; G01C 3/08; G01C 5/00
See application file for complete search history.

(56) References Cited

U.S. PATENT DOCUMENTS

| 2013/0060520 A1* | 3/2013 | Amor | G01S 5/0018 |
| | | | 702/154 |
| 2013/0096875 A1* | 4/2013 | Daniel | G01C 15/002 |
| | | | 702/159 |
| 2014/0071269 A1* | 3/2014 | Mohamed | G01B 11/14 |
| | | | 348/135 |

\* cited by examiner

*Primary Examiner* — Samantha K Abraham
(74) *Attorney, Agent, or Firm* — Peter J. Van Bergen

(57) ABSTRACT

A dimension measuring system and method are provided. Two track reference target (TRT) assemblies are positioned at spaced-apart locations on a railroad track's rails. Each of the TRT assemblies has two targets at fixed positions in a plane perpendicular to the rails. For each of the TRT assemblies, at least one of the two targets is positioned at a known and fixed height over one of the rails. A laser-based distance measuring device measures vector distances to the two targets associated with each of the TRT assemblies. The vector distances are processed in combination with the fixed positions to determine an elevation of each of the rails in the plane associated with each of the TRT assemblies.

9 Claims, 5 Drawing Sheets

FIG. 7

TRACK REFERENCE TARGETS AND METHOD OF USING SAME TO DEFINE LEFT AND RIGHT TOP-OF-RAIL ELEVATIONS

Pursuant to 35 U.S.C. §119, the benefit of priority from provisional application 62/003,972, with a filing date of May 28, 2014, is claimed for this non-provisional application.

FIELD OF THE INVENTION

The invention relates generally to dimensional measuring systems and methods, and more particularly to a railroad track reference target apparatus and method of using same to define the left and right top-of-rail elevations of a railroad track, determine the centerline of the railroad track, and determine the heights and widths of a load (commodity) that is to be transported via railway car on the track.

BACKGROUND OF THE INVENTION

Measurement of an object's dimensions has typically been accomplished in a manual fashion using fixed-length rulers, adjustable-length rulers (e.g., tape measures), plumb lines, hand levels and combinations thereof. Use of these various manual measurement tools becomes difficult and/or dangerous when object is large and/or irregular in shape, or is located in an environment that is limited in terms of accessibility or is inherently dangerous.

In general, oversized loads must be measured prior to their movement by any land, water, and/or air-based vehicle for reasons of safety, efficiency, etc. Oversized loads transported over land (e.g., by railroad, road travel, etc.) must be measured prior to being moved over a predetermined route in order to assure that the load can maintain safe clearance over the route. By way of illustrative example, this scenario will be explained for railway freight. In general, railway freight shipments that exceed a standard geometric envelope are deemed oversized and officially classified as "Dimensional" or "High-Wide-Loads" (HWLs). Each railroad typically has its own set of specifications for what is considered to be a HWL load. HWLs must be measured at points of origin and interchange points in route to their destinations to ensure that they can be safely transported over a particular rail line's route. Typically, several personnel are necessary for measuring a single oversized load.

The traditional method of measuring HWLs required personnel to either climb onto the load and/or use a ladder to physically measure the high points and wide points of the load. The typical tools used in the current measurement method include a tape measure, plumb line, carpenter's level, and variety of homemade tools to assist inspectors in measuring hard-to-reach high-wide points. Such manual measurements have a number of inherent limitations relative to accuracy, efficiency, standardization, documentation, and safety.

In terms of accuracy, there are a number of factors that contribute to measurement inaccuracies. For example, many HWLs have critical points that are difficult to reach. As a result, inspectors must often make multiple measurements to determine a single height or width at a critical point on the load. Recordation of these manual measurements can also be the source of mathematical and transcription errors. In addition, field measurements are currently referenced horizontally to the edge of the railcar and vertically to the deck of the railcar (which is then referenced vertically to one point on top of a rail and horizontally to a vertical projection of the railway car's centerline). This approach also makes the assumption that the center of a railcar is aligned with the centerline of the track. However, this assumption is not true in the vast majority of cases thereby leading to horizontal errors. Vertical errors arise because the current method assumes that the track is level and fails to account for uneven rail elevations. Further, the current method of measuring HWLs does not account for "humping" or "bellying" (positive or negative camber) of the railcar deck due to the weight of the load and/or the design of the railcar deck. Thus, the current method assumes that the railroad track is level and the deck of the railcar is also level. Since no track or car deck is perfectly level, inaccurate height and width measurement calculations are produced.

In terms of efficiency and safety, most HWLs require two or more people to make the measurements. The manual measurement method usually requires personnel to either climb onto the load and/or use a ladder to physically measure the high points and wide points. Often, a man-lift or bucket truck is required to reach critical positions on the load where dimensions are required. Climbing on the loads, positioning/repositioning ladders or bucket trucks are time-consuming tasks. Further, these pre-measuring steps expose personnel to trip/fall hazards on the deck of the railcar, slick surfaces during inclement weather, and overall difficulties in traversing loads due to the generally irregular shapes of HWLs. These combined inefficiencies of the current method also negatively affect overall rail yard operations. During the measurement process, "blue flag" protection is usually required which means the track where the load is being measured is closed. Moreover, if a ladder is used to measure the oversized load, it is often necessary to shut down adjacent tracks in addition to the track where the load is sitting. This negatively affects the railroad's ability to efficiently assemble and switch trains thereby delaying shipments. Additionally, a single measurement error could result in an inefficient routing of the load or a clearance deficiency resulting in a derailment, collision, property damage, environmental damage or even death.

In an effort to improve the accuracy, efficiency, and safety associated with measuring HWLs that are to be transported via railroad tracks, a laser-based dimensional object measurement method and system has been developed and is disclosed in U.S. Patent Publication No. 2013/0096875. Briefly, this reference discloses a method/system in which each of two targets is attached to a railroad track using a bar-like mechanism. The targets are positioned at each end of a railway car that is supporting a load (commodity) to be measured. A laser-based distance measuring device is positioned within line-of-sight of the targets and the load to be measured. The laser-based measuring device is used to measure vectors to the targets and vectors to positions on the load. The vectors to the targets are processed to generate horizontal and vertical references between the targets. The vectors to positions on the load are processed in order to generate dimensions of the load in relation to the horizontal and vertical references. While this system/method is a substantial improvement over the manual measurement method, it is predicated on an average top-of-rail height at a railroad track's centerline. However, most railroad tracks' left and right rails are not at the same elevation such that a load thereon is tilted side-to-side and/or front-to-back. For HWLs, this reality can lead to errors in a load's width or height that, in turn, can lead to an incorrect decision related to the load's ability to be safely transported over a particular rail line route.

SUMMARY OF THE INVENTION

Accordingly, it is an object of the present invention to provide track reference targets and a method of using same to define a railroad track's left and right top-of-rail elevations.

Other objects and advantages of the present invention will become more obvious hereinafter in the specification and drawings.

In accordance with the present invention, a dimension measuring system and method are provided. Two track reference target (TRT) assemblies are positioned at spaced-apart locations on a railroad track's parallel rails. Each of the TRT assemblies has two targets at fixed positions in a plane perpendicular to the rails. For each of the TRT assemblies, at least one of the two targets is positioned at a known and fixed height over one of the rails. A laser-based distance measuring device, positioned in line-of-sight of the two targets associated with each of the TRT assemblies, measures vector distances to the two targets associated with each of the TRT assemblies. A processor coupled to the laser-based distance measuring device processes the vector distances in combination with the fixed positions to determine an elevation of each of the rails in the plane associated with each of the TRT assemblies.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
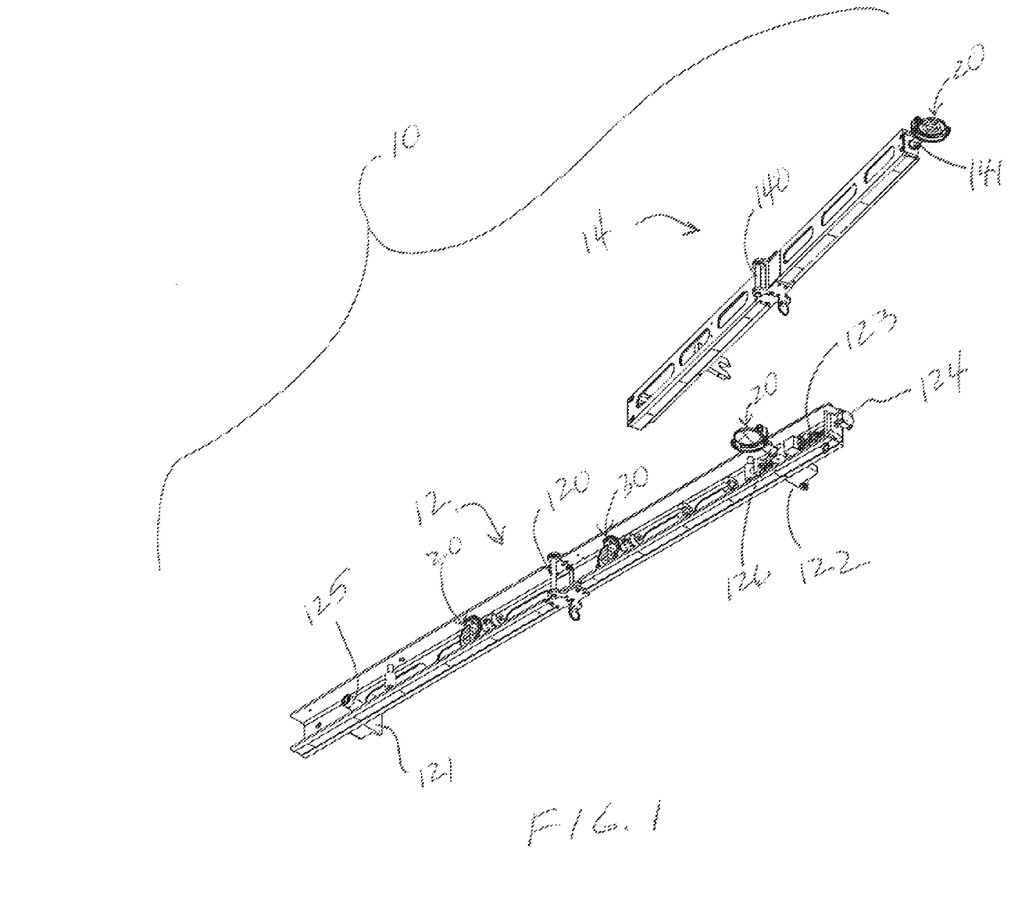
FIG. 1 is a partially exploded perspective view of a track reference target assembly in accordance with an embodiment of the present invention.

Referring now to the drawings, simultaneous reference will be made to FIGS. 1 and 2 where a track reference target (TRT) assembly in accordance with an embodiment of the present invention is shown in a partially exploded form (FIG. 1) and in an assembled form (FIG. 2), and is referenced generally by numeral 10. As will be explained further below, TRT assembly 10 will be mounted to a railroad track's rails and is used to facilitate the determination of elevations for each individual rail as well as the centerline of a railroad track. Rail elevations provide critical information used in calculating accurate load measurements for HWLs even when such measurements are made on non-level railroad tracks. Non-level railroad tracks make a railway car lean that, in turn, makes it very difficult to manually measure load width using conventional tools and methods that relay on plumb lines. Briefly, in an embodiment of the present invention, two TRT assemblies 10 will replace the target mechanisms used in the laser-based dimensional object measurement method and system described in the afore-referenced U.S. Patent Publication No. 2013/0096875, the contents of which are hereby incorporated by reference.

TRT assembly 10 includes a rigid and linear base rail 12 that will be mounted to a railroad track's rails and a rigid and linear arm rail 14 that is mounted to base rail 12. To simplify storage and handling of TRT assembly 10, each of base rail 12 and arm rail 14 can be made from multiple pieces or be collapsible. For example, in the illustrated embodiment, base rail 12 is hinged at a central portion thereof as indicated by numeral 120. Similarly, arm rail 14 is hinged at a central portion thereof as indicated by numeral 140. The particular hinging or coupling mechanisms used for a multi-piece base rail 12 or a multi-piece arm rail 14 are not limitations of the present invention.

Base rail 12 has two rail-engaging shoes 121 and 122 mounted thereon. Shoes 121 and 122 are configured to securely engage the inside portion of a railroad track's rail as will be described in greater detail below. Shoe 121 is fixed to base rail 12 whereas shoe 122 is movably mounted to base rail 12. By way of example, shoe 122 is mounted to a screw assembly 123 on base rail 12. Screw assembly 123 is operated (e.g., via manual operation using knob 124) to move shoe 122 towards or away from shoe 121 so that base rail 12 can be secured to the inside edges of a railroad track's left and right rails. Accordingly, once base rail 12 is mounted on a railroad track's rails, the distance between the two shoe-to-rail contact points is equal to the width of the track (also known as "track gauge") at that location.

Base rail 12 provides two mounting locations for laser-receiving targets. One location 125 is aligned with the portion of shoe 121 that will be aligned with the inside edge of one rail when TRT assembly 10 is mounted on a railroad track. The second location 126 is aligned and movable with the portion of shoe 122 that will be moved into alignment with the inside edge of a track's second rail. Locations 125 and 126 can define target receiving receptacles (e.g., tubes) for receiving the pin of a laser-receiving target. For example, FIG. 3A illustrates an exemplary target 20 having a base pin 22, a target swivel support 24 coupled to base pin 22, and a target face 26 coupled to swivel pins 24A of swivel support 24 that allows target face 26 to swivel about the axis 24B defined by swivel pins 24A. Target face 26 can include cross-hair 28 aligned with swivel axis 24B. In the illustrated embodiment, base pin 22 fits into one of the tubes at locations 125 or 126 such that cross-hair 28 defines location 125 or 126. Tube-to-pin engagement can include one or more positive retention elements, the choice of which is not a limitation of the present invention.

Figures 2, 3A, 3B:
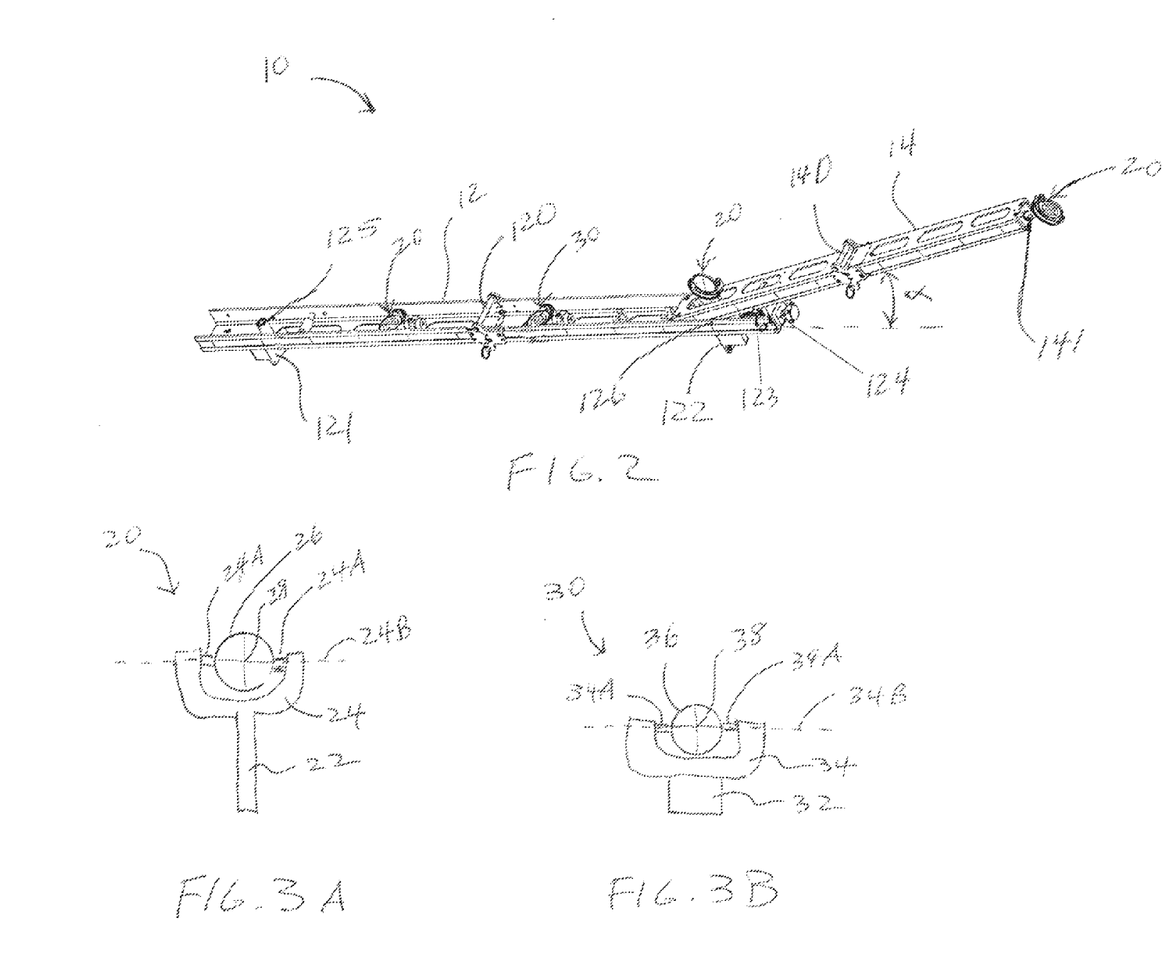
FIG. 2 is a perspective view of an embodiment of a track reference target assembly in an assembled state.
FIG. 3A is an isolated side view of a laser-receiving target in accordance with an embodiment of the present invention.
FIG. 3B is an isolated side view of a laser-receiving target in accordance with another embodiment of the present invention.

FIG. 3B illustrates another exemplary target 30 having a magnetic base 32, a target swivel support 34 coupled to magnetic base 32, and a target face 36 coupled to swivel pins 34A of swivel support 34. Magnetic base 32 allows target 30 to be readily positioned on a metal portion of a railway car for use in determining a railway car deck's centerline as will be explained further below. Similar to target face 26, target face 36 can include cross-hair 38 aligned with swivel axis 34B defined by swivel pins 34A. Swivel pins 24A and 34A can provide some swivel resistance so that the supported target face holds its swivel position until positively re-positioned. When not in use, targets 20 and/or 30 can be stored in base rail 12 as shown. Storage can also be provided in base rail 12 for extra targets 20 and/or 30.

Arm rail 14 is rigidly coupled or mounted to base rail 12 at a fixed acute angle α, the particular choice of which is not a limitation of the present invention. Arm rail 14 is configured/constructed to allow a target 20 (at location 126) to protrude therefrom and be visible after arm rail 14 is coupled to base rail 12 as shown in FIG. 2. The particular construction of arm rail 14 that provides such coupling/mounting to base rail 12 is not a limitation of the present invention. The outboard end of arm rail 14 defines a location 141 (e.g., using a tube receptacle) for the mounting of a laser-receiving target (e.g., target 20).

Figure 4:
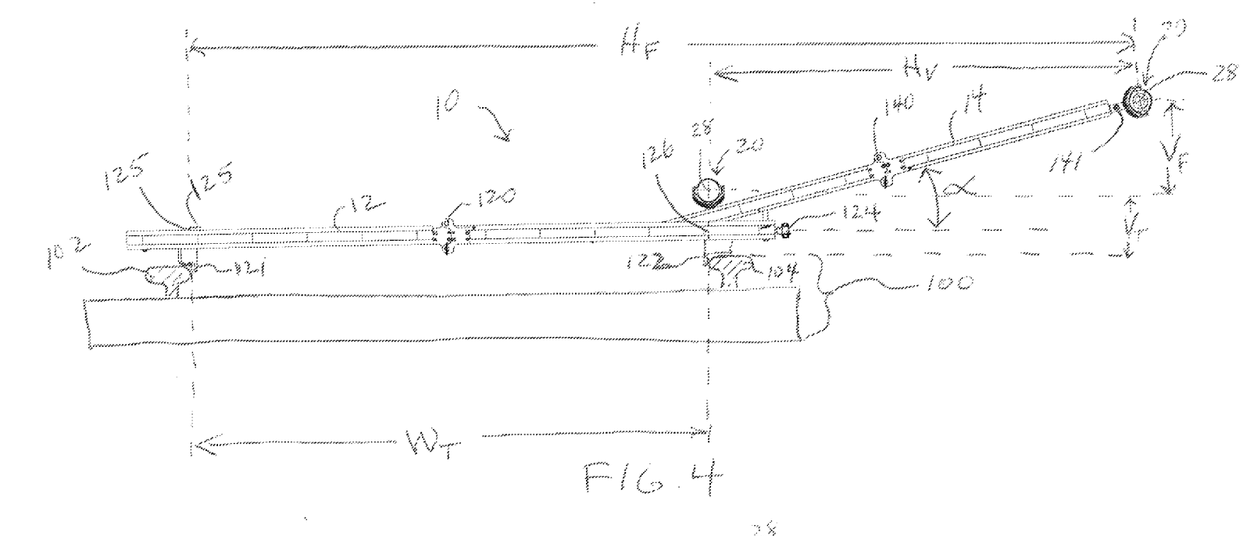
FIG. 4 is a side view of a track reference target assembly illustrating the positioning of two reference targets in accordance with an embodiment of the present invention.
Figure 5:
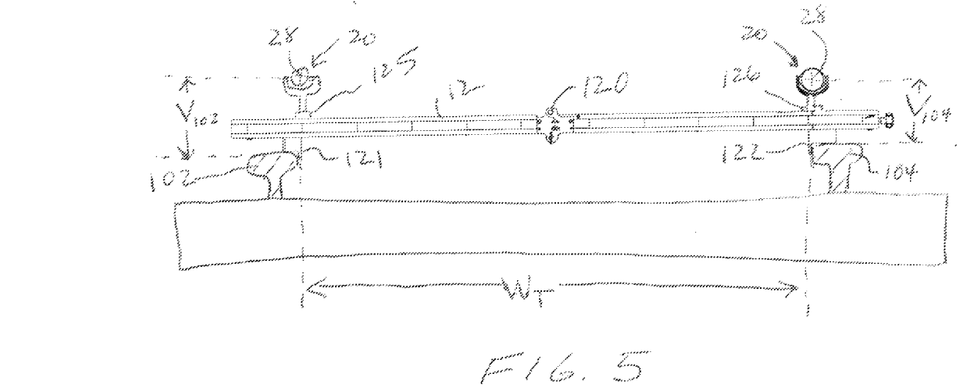
FIG. 5 is a side view of a track reference target assembly illustrating the positioning of two reference targets in accordance with another embodiment of the present invention.

As mentioned above, TRT assembly 10 will be mounted to a railroad track and used in conjunction with the above-referenced laser-based dimensional measurement system. As will be explained further below, TRT assembly 10 can be configured and used to determine left and right rail elevations of a railroad track when only one (nearest) rail is "visible" to the laser-based system or when both rails are visible. FIG. 4 illustrates TRT assembly 10 mounted on parallel rails 102/104 of a railroad track 100 when only rail 104 is visible. FIG. 5 illustrates another TRT assembly (comprising just base rail 12 with two targets 20) mounted on rails 102/104 when both rails are visible. The geometries provided by both TRT assemblies that make the determination of left and right rail elevations possible are also illustrated.

Referring first to FIG. 4 where it is assumed that only rail 104 is visible, shoe 121 is positioned to abut the inside edge of rail 102 and shoe 122 is the moved (by turning knob 124) to securely abut the inside edge of rail 104. As a result, TRT assembly 10 is firmly coupled to track 100. Arm rail 14 extends from base rail 12 at angle α as shown. Targets 20 are placed at fixed locations 126 and 141 where location 126 is a known height over rail 104 and location 141 is known and fixed relative to that of locations 125 and 126. Location 141 is outside the confines of railroad track 100 and on the side thereof adjacent to rail 104. The fixed geometries provided by the TRT assembly and this setup yield the following information:

a known and fixed horizontal distance $H_F$ between target location 125 and cross-hair 28 of target 20 placed at location 141;

a known and fixed vertical distance $V_F$ between cross-hair 28 of target 20 at location 126 and cross-hair 28 of target 20 positioned at location 141;

a known and fixed vertical distance $V_T$ between cross-hair 28 at target 20 at location 126 and top-of-rail 104;

a known and fixed angle α between arm rail 14 and base rail 12;

a horizontal distance $H_V$ between cross-hair 28 of target 20 at location 126 and cross-hair 28 of target 20 at location 141 that is measured and will vary based on the position of shoe 122 owing to the track gauge; and the width $W_T$ of track 100 between rails 102/104 is defined between locations 125 and 126 (i.e., $H_F$-$H_V$). These known and fixed relationships are processed in combination with vector distances (from a measuring device) to each of targets 20 to determine the top-of-rail elevations of rails 102 and 104 at the intersection of the rails with the plane in which the two targets 20 (i.e., the target cross-hairs) lie. For load measurement scenarios requiring measurements to be made from both sides of a railway car, a third target 20 can be positioned at location 125, or arm rail 14 with target 20 affixed thereto can be moved to the other side of base rail 12. In this way, the original reference position of base rail 12 remains the same for all measurements. The positioning of a third target 20 in position 125, or the repositioning of arm rail 14 with its target 20, provides the ability to establish the three-dimensional spatial position of the laser measuring device for continued measuring on the opposite side of the railway car from the originating position of the laser measuring device.

Referring next to FIG. 5 where it is assumed that both rails 102 and 104 are visible from the laser-based measuring device, arm rail 14 can be removed from base rail 12 such that only base rail 12 is coupled/mounted to rails 102/104 in the same fashion as described above. In this embodiment, the TRT assembly is defined when a target 20 is placed at each location 125 and 126. The fixed geometries provided by this TRT assembly and this setup yield the following information:

the width $W_T$ of track 100 between rails 102/104 is defined between cross-hairs 28 of targets 20 at locations 125 and 126;

a known and fixed vertical distance $V_{102}$ between cross-hair 28 of target 20 at location 125 and the top of rail 102; and a known and fixed vertical distance $V_{104}$ between cross-hair 28 of the target 20 at location 126 and the top of rail 104. These known and fixed relationships are processed in combination with the vector distances (from a measuring device) to each of targets 20 to determine the top-of-rail elevations of rails 102 and 104 at the intersection of the rails with the plane in which the two targets 20 (i.e., the target cross-hairs) lie.

Figure 6:
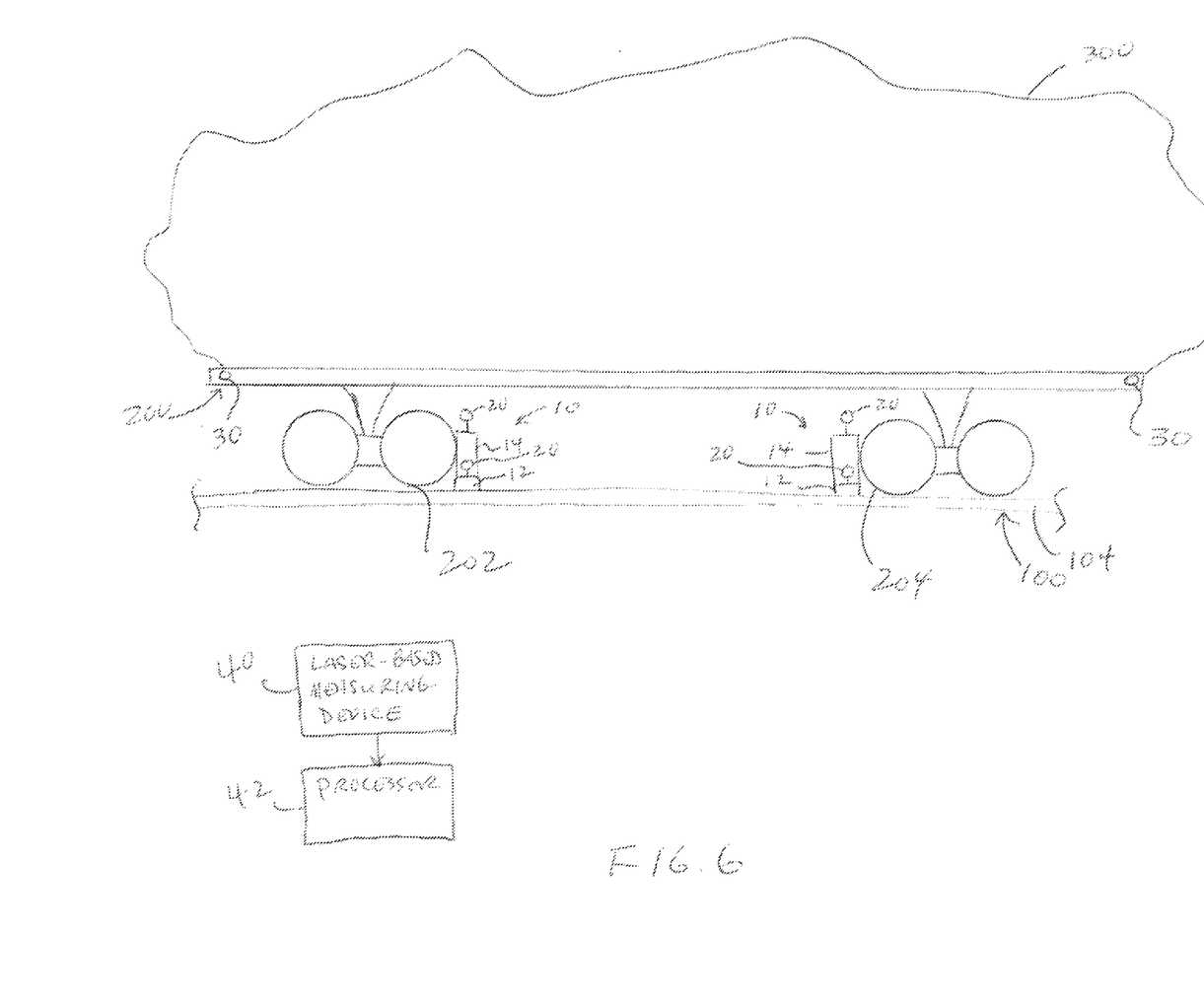
FIG. 6 is a schematic side view of a railway car-supported load and two track reference target assemblies positioned on a railroad track under the railway car in accordance with an embodiment of the present invention.

In both of the above configurations, elevations of a railroad track's left and right rails (i.e., the top of each rail) can be accurately determined. When both rails are visible from the laser measuring device, two of the TRT assemblies illustrated in FIG. 5 can be positioned at spaced-apart locations on a track with each TRT assembly located adjacent to a railway car's wheels. For this type of installation, the top-of-rail elevations are readily determined using the known vertical distances $V_{102}$ and $V_{104}$. However, since only one rail is typically visible during a measurement session, FIG. 6 depicts a dimension measurement scenario for a load measurement where only rail 104 is visible. In this scenario, two fully-assembled TRT assemblies 10 to include arm rail 14 (as shown in FIG. 4) will be used. A railway car 200 has its sets of wheels 202/204 on the rails of track 100. A load (e.g., an HWL) 300 to be measured is on railway car 200. TRT assemblies 10 are placed adjacent wheels 202/204 with one TRT assembly 10 being adjacent to wheels 202 and the other TRT assembly 10 being adjacent to wheels 204. In this way, TRT assemblies 10 (and the measurements generated using same) are located where the weight of load 300 is displaced onto the rails of track 100. In both of the TRT assembly configurations shown in FIGS. 4 and 5, each TRT assembly defines two fixed target locations in a plane that is perpendicular to the rails of track 100. FIG. 6 also illustrates the attachment (e.g., magnetic attachment) of two targets 30 to the side of either end of railway car 200 for use in determining the centerline of railway car 200 as will be explained further below.

A laser-based measuring device 40 is used to measure vector distances from device 40 to the cross-hairs on each of targets 20 on a TRT assembly. These vector distances in combination with the above described known/fixed parameters can be used (i.e., processed by a processor 42) to accurately determine a top-of-rail elevation of each rail of track 100. Accordingly, the combination of the two TRT assemblies, measuring device 40, and processor 42 define a dimension measuring system. The four top-of-rail elevations define a top-of-rail reference plane that will be used for all load measurements. Since this reference plane accounts for rail height variations, the outer dimensions of load 300 can be accurately determined using perpendiculars to the reference plane. Accuracy can be further enhanced by determining (via interpolation) particular top-of-rail elevations at specific locations along load 300. That is, knowing top-of-rail elevations at each of TRT assemblies 10 provides the data needed to interpolate top-of-rail elevations aligned with a particular location along a longitudinal axis of load 300 at which at critical dimensional measurement must be made. Note that the above-described reference plane can also be determined using two TRT assemblies configured as shown in FIG. 5 when both rails of a railroad track are visible.

Figure 7:
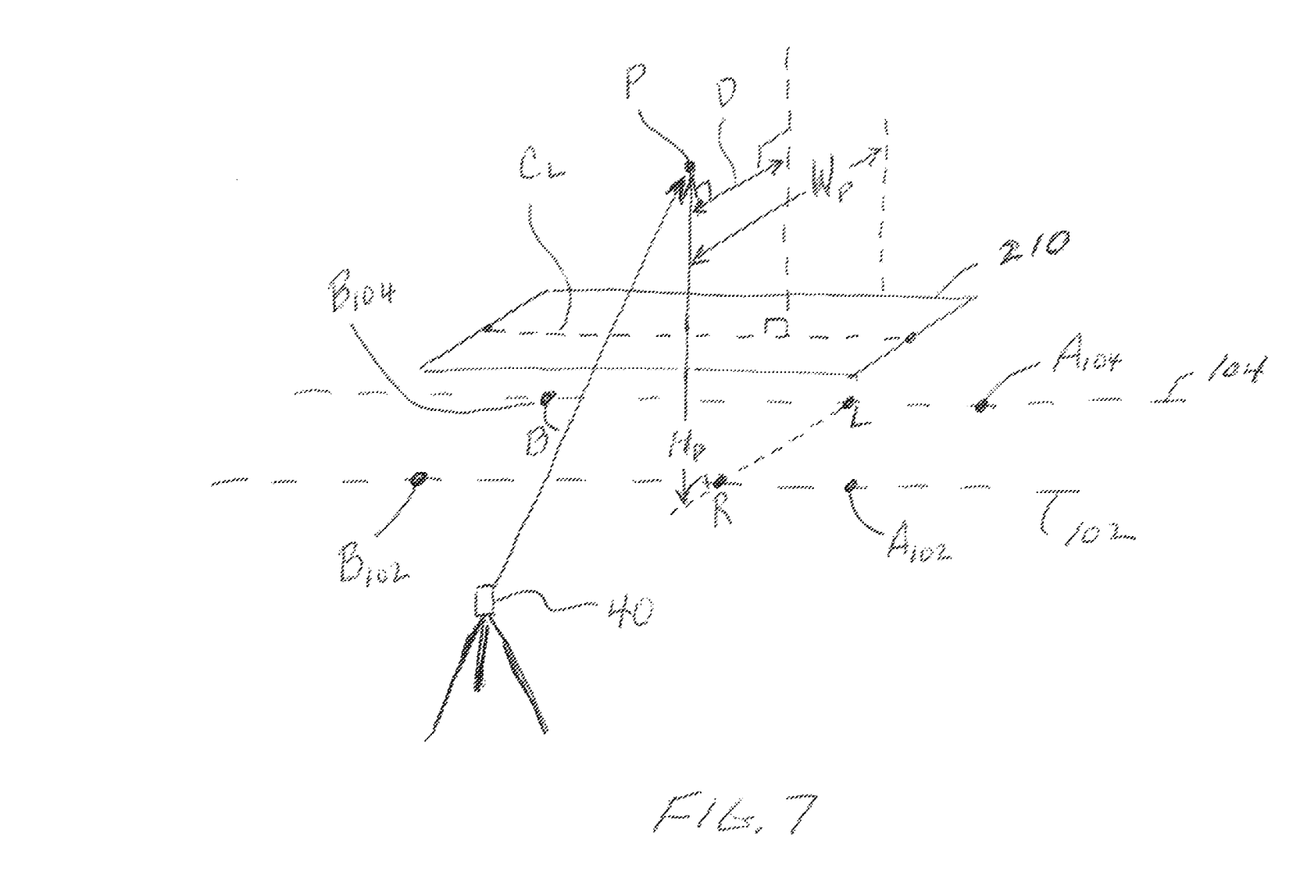
FIG. 7 depicts measurement geometry used to determine height and width measurements of a point on a load that rests on the deck of a railway car in accordance with the present invention.

Referring now to FIG. 7, measurement geometry made possible by the present invention is shown and will be used to describe how to determine height and width measurements of a load (not shown) based on a point of interest "P" on the load that is resting on the deck (i.e., the rectangle referenced by numeral 210) of a railway car (not shown). For example, a reflectorless laser-based measuring device (e.g., laser-based measuring device 40) can be used to directly measure a vector distance to point P. The railroad track's rails 102 and 104 are illustrated with dashed lines. The points labeled $A_{102}$, $A_{104}$, $B_{102}$, and $B_{104}$ are the top-of-rail heights of rails 102 and 104 determined using two TRT assemblies (i.e., two of the TRT assemblies illustrated in FIG. 4 or two of the TRT assemblies illustrated in FIG. 5) as described above. That is, the elevations $A_{102}$ and $A_{104}$ are determined by one TRT assembly whose two targets lie in a plane that is perpendicular to rails 102 and 104, and the elevations $B_{102}$ and $B_{104}$ are determined by one TRT assembly whose two targets lie in another plane that is perpendicular to rails 102 and 104. The height "$H_P$" of the load at point P is perpendicular and referenced to a line R-L between rails 102 and 104 under point P. The height of rail 102 at point R is determined by a straight grade interpolation between the top-of-rail elevations $A_{102}$ and $B_{102}$ along rail 102. Similarly, the height of rail 104 at point L is determined by a straight grade interpolation between the top-of-rail elevations $A_{104}$ and $B_{104}$ along rail 104.

The width "$W_P$" of the load at point P can be referenced to either the centerline of the track (i.e., a line centrally positioned between and parallel to rails 102 and 104), or to the centerline "$C_L$" of deck 210. Currently, several industry associations (to include the American Railway Engineering and Maintenance-of-Way Association or AREMA) have recommended that width measurements be made relative to the centerline of a railway car's deck. Accordingly, centerline $C_L$ will be used herein to describe the determination of width $W_P$ at point P. Specifically, width $W_P$ is determined by doubling the perpendicular distance "D" from point P to centerline $C_L$. Determination of centerline $C_L$ is accomplished by attaching targets 30 to both ends of one side of railway car 200 as shown in FIG. 6. Since the center for each of targets 30 is displaced from railway car 200 by a known/fixed amount, vector measurements to targets 30 can be used in combination with measurements of the width of railway car 200 at the locations of targets 30 in order to determine centerline $C_L$.

The advantages of the present invention are numerous. The TRT assembly is a simple tool that enhances the load measurement capabilities of a laser-based load measurement system. Specifically, each TRT assembly positions two targets in a known and fixed geometric relationship in a plane that is perpendicular to a railroad track's rails. As a result, the present invention's measurement process accurately determines top-of-rail elevations (and center-of-track if needed) that can be used as reference plane measurements when measuring/determining a load's height and width at critical points of interest. By starting with accurate top-of-rail measurements, the present invention can be used to determine accurate height and width measurements even when a railway car is leaning due to elevation differences in a railroad track's rails. The TRT assembly is easily positioned/configured by a single operator working on the ground. The TRT assembly provides additional magnetically-mountable targets for placement on a railway car for use in determining a railway car's centerline. Once the TRT assemblies are set up, measurements to targets and to various positions on a load can be made. The system's processor can determine and report/display, for example, "height above top-of-rail" or ATR as it is known, overall width, side of the railway car that the measurement was taken, and distance from the laser measuring device to the point of interest as well as provide the operator the chance to enter a description of the point measured. Measured points can be automatically sorted from highest to lowest ATR. The widest point measured and/or the last point measured can be automatically highlighted/noted.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A dimension measuring method, comprising the steps of:
    positioning a first target and a second target at fixed positions in a first plane perpendicular to a railroad track's parallel rails wherein one of said first target and said second target in said first plane is positioned at a known and fixed height over a first one of the rails;
    positioning a third target and a fourth target at fixed positions in a second plane perpendicular to the rails wherein one of said third target and said fourth target in said second plane is positioned at a known and fixed height over the first one of the rails, and wherein said first plane is spaced-apart from said second plane;
    measuring, using a laser-based distance measuring device, vector distances to said first target and said second target in said first plane, and to said third target and said fourth target in said second plane; and
    determining, using a processor coupled to said laser-based measuring device, an elevation of each of the rails in said first plane and said second plane using said vector distances and said fixed positions in said first plane and said fixed positions in said second plane, wherein said elevation of each of the rails in said first plane and said second plane define a top-of-rail reference plane and wherein, for an object positioned above said top-of-rail reference plane, dimensions of the object are measured relative to said top-of-rail reference plane.

2. The dimension measuring method as in claim 1 wherein, for each said step of positioning, one of said first target and said second target and one of said third target and said fourth target are positioned outside the confines of the railroad track's parallel rails.

3. The dimension measuring method as in claim 1, further comprising the steps of:
   measuring, using said laser-based measuring device, a vector distance to a point on a the object at a location above the rails and between said first plane and said second plane; and
   determining, using said processor, a height and width of the object at the point on the object using said vector distance to the point and said top-of-rail reference plane.

4. The dimension measuring method as in claim 1, wherein a railway car having spaced-apart sets of wheels is positioned on the rails, wherein said first plane is located adjacent to one of the sets of wheels, and wherein said second plane is located adjacent to another of the sets of wheels.

5. The dimension measuring method as in claim 1, wherein a railway car having a deck of known width is positioned on the rails, said method further comprising the steps of:
   positioning an additional target on each of opposing ends of the railway car; measuring a vector distance to each said additional target; and determining a centerline of the deck of the railway car using the known width of the deck and said vector distance to each said additional target.

6. A dimension measuring method, comprising the steps of:
   providing a first target, a second target, a third target, a fourth target, a laser-based measuring device, and a processor coupled to the laser-based measuring device;
   positioning the first target and the second target at fixed positions in a first plane perpendicular to a railroad track's parallel rails wherein one of the first target and the second target in said first plane is positioned at a known and fixed height over a first one of the rails;
   positioning the third target and the fourth target at fixed positions in a second plane perpendicular to the rails wherein one of the third target and the fourth target in said second plane is positioned at a known and fixed height over the first one of the rails, and wherein said first plane is spaced-apart from said second plane;
   measuring, using the laser-based distance measuring device, vector distances to the first target and the second target in said first plane, and to the third target and the fourth target in said second plane; and
   determining, using the processor coupled to the laser-based measuring device, an elevation of each of the rails in said first plane and said second plane using said vector distances and said fixed positions in said first plane and said fixed positions in said second plane, wherein said elevation of each of the rails in said first plane and said second plane are used to measure dimensions of an object positioned above the rails.

7. The dimension measuring method as in claim 6 wherein, for each said step of positioning, one of said first target and said second target and one of said third target and said fourth target are positioned outside the confines of the railroad track's parallel rails.

8. The dimension measuring method as in claim 6, further comprising the steps of:
   measuring, using said laser-based measuring device, a vector distance to a point on the object at a location above the rails and between said first plane and said second plane; and
   determining, using said processor, a height and width of the object at the point on the object using said vector distance to the point and said elevation of each of the rails in said first plane and said second plane.

9. The dimension measuring method as in claim 6, wherein a railway car having a deck of known width is positioned on the rails, said method further comprising the steps of:
   positioning an additional target on each of opposing ends of the railway car; measuring a vector distance to each said additional target; and determining a centerline of the deck of the railway car using the known width of the deck and said vector distance to each said additional target.

* * * * *